United States Patent
Leparoux et al.

(10) Patent No.: US 11,009,231 B2
(45) Date of Patent: May 18, 2021

(54) AERODYNAMIC INJECTION SYSTEM FOR AIRCRAFT TURBINE ENGINE, HAVING IMPROVED AIR/FUEL MIXING

(71) Applicant: SAFRAN AIRCRAFT ENGINES, Paris (FR)

(72) Inventors: Julien Marc Matthieu Leparoux, Paris (FR); Haris Musaefendic, Maisons Alfort (FR); Zakaria El Gnaoui, Pierrefitte sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 150 days.

(21) Appl. No.: 15/770,573

(22) PCT Filed: Oct. 27, 2016

(86) PCT No.: PCT/FR2016/052793
§ 371 (c)(1),
(2) Date: Apr. 24, 2018

(87) PCT Pub. No.: WO2017/072451
PCT Pub. Date: May 4, 2017

(65) Prior Publication Data
US 2018/0313542 A1    Nov. 1, 2018

(30) Foreign Application Priority Data
Oct. 29, 2015   (FR) ...................................... 15 60358

(51) Int. Cl.
*F23R 3/14*  (2006.01)
*F23R 3/28*  (2006.01)
*F23R 3/50*  (2006.01)

(52) U.S. Cl.
CPC .................. *F23R 3/14* (2013.01); *F23R 3/28* (2013.01); *F23R 3/286* (2013.01); *F23R 3/50* (2013.01); *Y02T 50/60* (2013.01)

(58) Field of Classification Search
CPC ............... F23R 3/14; F23R 3/28; F23R 3/286
See application file for complete search history.

(56) References Cited

U.S. PATENT DOCUMENTS 4,222,243 A * 9/1980  Mobsby .................... F23R 3/20
                                                                    60/742
4,425,755 A    1/1984  Hughes
(Continued)

FOREIGN PATENT DOCUMENTS

FR    2 685 452 A1    6/1993
FR    2 832 493 A1    5/2003
(Continued)

OTHER PUBLICATIONS

International Search Report for International Application No. PCT/FR2016/052793 dated Feb. 7, 2017.
(Continued)

*Primary Examiner* — Arun Goyal
*Assistant Examiner* — Henry Ng
(74) *Attorney, Agent, or Firm* — Pearne & Gordon LLP

(57) ABSTRACT

To improve air/fuel mixing at low speed, the invention concerns an aerodynamic injection system (30) for a combustion chamber (8) of an aircraft turbine engine, the system comprising a central body (70) comprising a first air circulation space (72) and a swirler (74) allowing air to penetrate into the first air circulation space (72), the hollow body (70) also comprising a fuel circuit (92, 93, 82) arranged at least partially around the first space (72), the circuit comprising a second annular space (82) for a fuel film to circulate and fuel supply structures (92, 93) communicating with the second
(Continued)

space (82), the spaces (72, 82) opening into a third air and fuel mixing space (86). According to the invention, the system comprises fuel injection openings (90) that bring the fuel circuit into communication with the first space (72).

13 Claims, 4 Drawing Sheets

(56) References Cited

U.S. PATENT DOCUMENTS

| | | | | |
|---|---|---|---|---|
| 5,351,477 | A * | 10/1994 | Joshi | F23C 7/004 239/400 |
| 5,353,599 | A * | 10/1994 | Johnson | F23M 5/085 60/39.83 |
| 5,899,075 | A * | 5/1999 | Dean | F23C 7/004 60/737 |
| 5,987,889 | A * | 11/1999 | Graves | F23C 7/004 60/746 |
| 7,114,337 | B2 * | 10/2006 | Cazalens | F23R 3/286 60/737 |
| 7,340,900 | B2 * | 3/2008 | Xu | F23R 3/14 60/737 |
| 8,454,350 | B2 * | 6/2013 | Berry | F23R 3/10 431/8 |
| 2004/0006993 | A1 * | 1/2004 | Stuttaford | F23L 7/002 60/776 |
| 2009/0084109 | A1 * | 4/2009 | Lee | F23R 3/12 60/740 |
| 2009/0113893 | A1 * | 5/2009 | Li | F23R 3/14 60/737 |
| 2016/0003156 | A1 * | 1/2016 | Hanson | F23R 3/14 239/408 |

FOREIGN PATENT DOCUMENTS

| | | |
|---|---|---|
| FR | 2 875 585 A1 | 3/2006 |
| FR | 2 919 672 A1 | 2/2009 |

OTHER PUBLICATIONS

Written Opinion for International Application No. PCT/FR2016/052793 dated Feb. 7, 2017.
French Search Report issued in Patent Application No. FR 15 60358 dated Jul. 15, 2016.

* cited by examiner

AERODYNAMIC INJECTION SYSTEM FOR AIRCRAFT TURBINE ENGINE, HAVING IMPROVED AIR/FUEL MIXING

This is a National Stage application of PCT international application PCT/FR2016/052793, filed on Oct. 27, 2016 which claims the priority of French Patent Application No. 15 60358 entitled "AERODYNAMIC INJECTION SYSTEM FOR AIRCRAFT TURBINE ENGINE, HAVING IMPROVED AIR/FUEL MIXING", filed Oct. 29, 2015, both of which are incorporated herein by reference in their entirety.

TECHNICAL FIELD

The present invention relates to the field of combustion chambers for aircraft turbomachines, preferably for turbofan engines.

It relates more precisely to aerodynamic injection systems equipping the combustion chamber, these injection systems having the main function to mix fuel delivered by the injectors, to the air flow.

STATE OF PRIOR ART

Injection systems are the subject of many developments. Their design is constantly optimised so as to improve their performance in terms of ground lighting, altitude relighting, or even flame-out. It is also attempted to limit as much as possible idle pollution, which is closely related to the ability of the injection system to atomise and mix the injected fuel with air. Such aerodynamic injection systems are known from documents FR 2 875 585, or even documents FR 2 685 452 and FR 2 832 493.

However, in some low-speed operating phases, atomising the fuel often turns out to be insufficient because of low air flow rates in presence. As a result, fuel droplets with high diameters are obtained, the evaporation of which is longer and more difficult.

Consequently, there is a need for improving the atomisation process, in order to further optimise the air-fuel mixture, in particular at low speed.

DISCLOSURE OF THE INVENTION

To meet at least partially this need, the invention has first the object to provide an aerodynamic injection system for a combustion chamber of an aircraft turbomachine, the system comprising a hollow central body including a first air circulation space as well as an air introduction swirler enabling air located outside the hollow central body to penetrate inside the first air circulation space, said hollow body also including a fuel circuit arranged at least partly about the first space, the circuit comprising a second annular space for circulating a fuel film and fuel supply means communicating with said second space, the first and second spaces opening into a third space of air-fuel mixture. According to the invention, the system includes fuel injection ports communicating the fuel circuit with said first air circulation space.

Thus, the invention relies on the principle of taking part of the fuel flow, to inject it directly in the first space within which air circulates, for the purpose of obtaining a better atomisation of this fuel in fine droplets, even at a low speed. The improvement of fuel atomisation generates positive effects in terms of widening the lighting field, lowering the lean flame-out richness, increasing the combustion yield, decreasing polluting emissions, or even decreasing the occurrence and deposition of coke on the injection system, which enables to extend the lifetime of the parts in presence.

The invention has preferably at least any of the following optional characteristics, taken alone or in combination.

The central body is equipped with an annular wall delimiting internally at least one part of said first air circulation space, and delimiting externally, with an external element of the hollow central body, at least one part of said second annular space for circulating the fuel film, and the fuel injection ports pass through said annular wall. Alternatively, these injection ports could be arranged upstream of the annular wall, so as to open still into the first space followed by air.

The fuel injection ports are distributed in circumferential rows about a central axis of the injection system, said rows being axially aligned or staggeredly arranged.

The injection ports each have an outlet axis included in an axial plane of the injection system, i.e. without any circumferential component. Alternatively, the injection ports each have an outlet axis having a non-zero circumferential component, so as to generate a spinning of the fuel flow rate penetrating said first space.

In addition, the outlet axis of each injection port is tilted so as to inject fuel downstream inside said first space.

The air introduction swirler includes vanes, preferably tilted so as to generate a spinning of the air flow penetrating said first space.

Said fuel supply means comprise a plurality of ducts, preferably arranged alternately with said vanes of the swirler, along the circumferential direction.

The injection system also includes an external body, preferably comprising an additional air introduction swirler.

Finally, another object of the invention is an aircraft turbomachine comprising such an injection system, the turbomachine being preferentially a turbofan engine.

Further advantages and characteristics of the invention will appear in the non-limiting detailed description below.

BRIEF DESCRIPTION OF THE DRAWINGS

This description will be made with regard to the appended drawings in which.

DETAILED DESCRIPTION OF PREFERRED EMBODIMENTS

Figure 1:
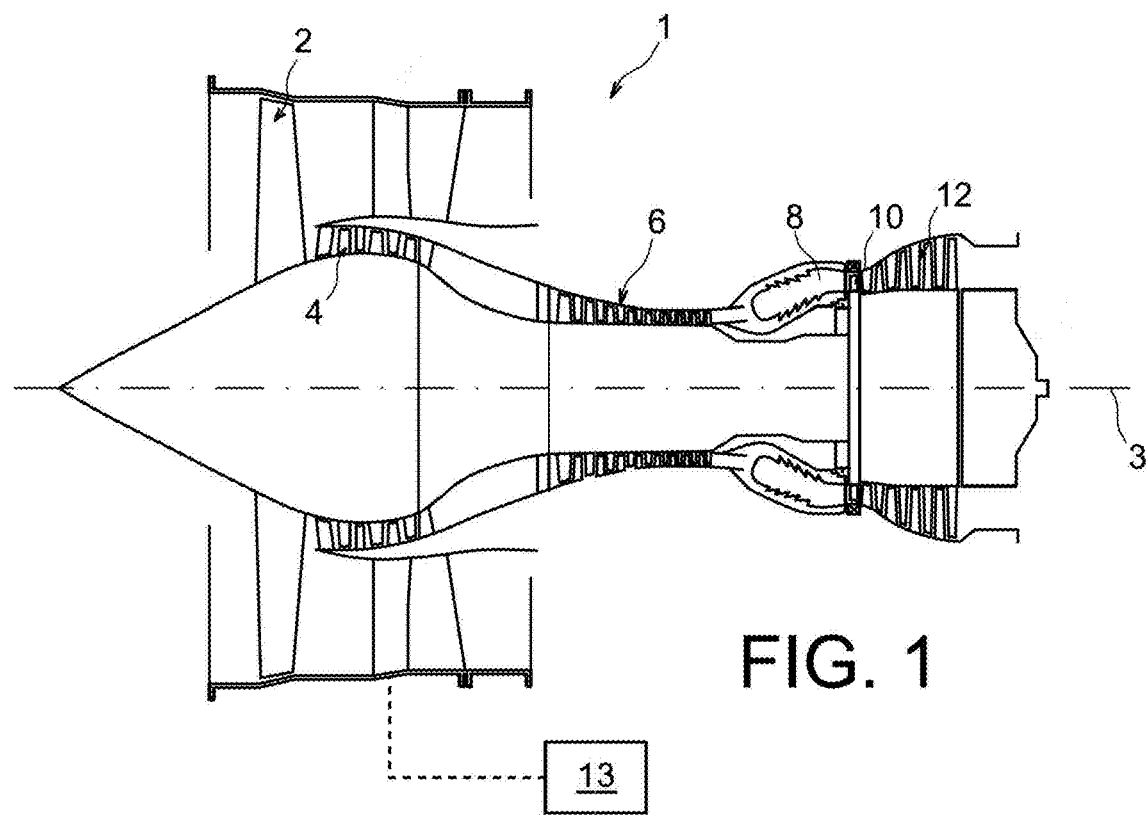
FIG. 1 represents a schematic longitudinal cross-section view of a turbofan engine according to the invention.

In reference first to FIG. 1, an aircraft turbomachine 1 is represented, according to a preferred embodiment of the invention. This is here a two-shaft turbofan engine. However, it could be a turbomachine of another type, for example a turboprop engine, without departing from the scope of the invention.

The turbomachine 1 has a longitudinal axis 3 about which its different components extend. It comprises, from upstream to downstream along a main direction of gas flow through this turbomachine, a fan 2, a low pressure compressor 4, a high pressure compressor 6, a combustion chamber 8, a high pressure turbine 10 and a low pressure turbine 12. Conventionally, this turbomachine 1 is controlled by a control unit 13, only schematically represented. This unit 13 enables in particular the different operating points of the turbomachine to be controlled.

Figure 2:
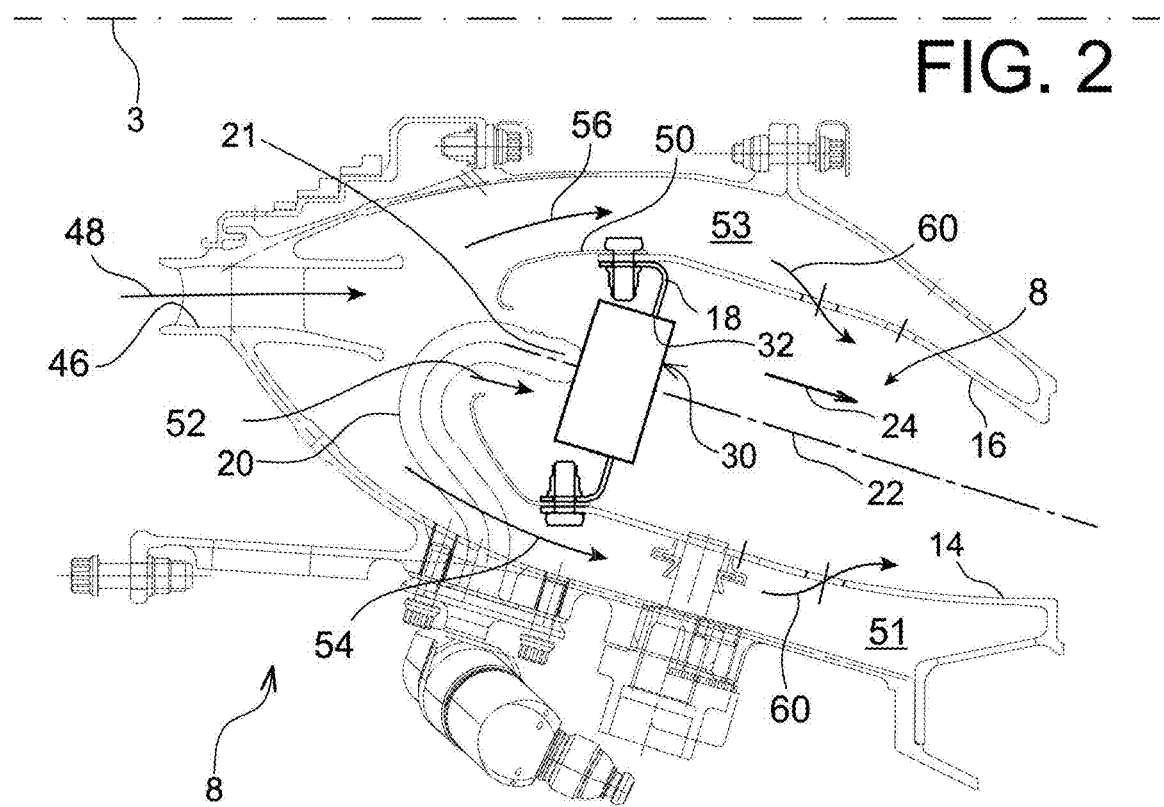
FIG. 2 represents a half-cross-section longitudinal view of the combustion chamber of the turbofan engine shown in the preceding figure.

A part of the combustion chamber 8 is reproduced in more detail in FIG. 2. It has in particular an external ferrule 14 centred on the axis 3, an internal ferrule 16 also centred on the same axis, and a chamber bottom 18 connecting both ferrules at the upstream end thereof. Fuel injectors 20 are evenly distributed on the chamber bottom, along the circumferential direction (a single injector being visible in FIG. 2). Each of them has an injector nose 21, oriented along a main axis 22 slightly tilted with respect to the axis 3. In this regard, it is indicated that this axis 22 is parallel to the main flow direction of the flow 24 through the chamber.

An injection system 30, schematically represented in FIG. 2, is associated with each injector 20. The injection system 30 cooperates upstream with the injector nose 21, whereas it opens downstream into the combustion chamber 8. The injection system 30 is housed in an aperture 32 provided through the chamber bottom 18. Thus, on this chamber, several apertures 32 circumferentially spaced from each other are provided, and each associated with an injection system 30 the central axis of which corresponds to the axis 22.

The combustion chamber 8, and in particular each injection system 30, are supplied in the direction of the arrow 48 with pressurised air at the passageway 46 shown in FIG. 2, this passageway enabling pressurised air input from the high pressure compressor located more upstream. This pressurised air is used for combustion and cooling of the combustion chamber 8. Part of this air is introduced in the combustion chamber 8 at the central aperture of a cover 50, through which the injector 20 passes. Another part of the air flows to the air flow passageways 51, 53, respectively along the directions 54 and 56 and then along the direction 60. The air flow depicted by the arrows 60 then penetrates the combustion chamber 8 through primary ports and dilution ports and cooling elements (multiperforations, cooling films, etc.).

Part of the air from the flow along the arrows 52 supplies each injection system 30, one of which will now be described in more detail in reference to FIGS. 3 to 8.

The system 30 first includes an external body 62 equipped with an air introduction swirler 64, supplied with air by a part 52" of the flow 52, and also called an external swirler. This swirler 64 is axial, and opens into an annular channel 66 externally delimited by an aerodynamic bowl 40 equipped with a first downstream flared end 42, called a divergent part. Conventionally, it is noted that the terms "upstream" and "downstream" are to be considered with respect to the main flow direction of the flow 24 through the chamber 8.

The bowl 40 is integral with the external body 62. Upstream, the bowl includes a base 44 also centred on the axis 22, as the flared part 42. This base 44 is located in the downstream continuity of the swirler 64.

The flared part 42 is equipped with an annular row of holes 67 for introducing air in the combustion site of the chamber 8. These holes are located in proximity of a fastening clip 68 enabling the bowl to be fastened to the chamber bottom 18, in the associated aperture 32.

The injection system 30 also includes a hollow central body 70, the downstream end of which is housed inside the external body 62. This external body 70 is made as a single piece, or using several elements secured to each other as will be detailed hereinafter.

The central body 70 includes a first cylindrical space 72 centred on the axis 22 of the device 30. This first space 72 is dedicated to the air circulation from the flow 52. To do this, the body 70 includes an air introduction swirler 74 equipped with vanes 76, this swirler being also called an internal swirler. The vanes are circumferentially distributed about the axis 22. A part 52' of the air flow 52 passes through these vanes 76 which are globally radially oriented, to give rise to an air flow 77 conveying within the first space 72. The vanes 76 can on the other hand be circumferentially tilted, so as to create a spinning of the air flow 77 along the axis 22, that is a swirling air flow 77.

The first space 72 is delimited by an upstream bottom 78, and remains open downstream. The sidewall aiming at forming the space 72 includes an upstream part at which the vanes 76 of the swirler 74 open, whereas its downstream part consists of an annular wall 80 centred on the axis 22. This annular wall 80 is preferentially cylindrical, with a circular cross-section. Thus, it delimits internally a downstream part of the first space 72, and delimits externally a second annular space 82 centred on the axis 22. This second annular space 82 is integral with a fuel circuit, and is delimited together with an external element 84 of the central body, received in the external body 62. The second space 82 is located about the first space 72. The first and second spaces 72, 82 are delimited downstream by the downstream end of the annular wall 80, from which these two spaces 72, 82 open into a third space 86 for the air-fuel mixture. This third space extends to the downstream end of the central body 70, and then is flared to extend up to the downstream end of the bowl 40. By way of example and as will be better visible in FIG. 5, the body 70 can have an upstream part made as a single piece as well as a downstream part secured to the upstream part. The downstream part thereby defines the third space 86 as well as the external part of the second annular space 82.

The fuel circuit also includes fuel supply means located upstream of the annular space 82. These means first include a distributor 92 delimited by the bottom 78, and forming a cavity supplied with fuel by the injector nose 21 with which this distributor 92 cooperates. The latter is arranged at the upstream end of the central body 70. It extends to a plurality of fuel ducts 93 circumferentially spaced from each other, and preferably arranged alternately with the vanes 76 of the air swirler 74, as is visible in FIG. 4. The downstream end of the ducts 93 open into the second annular space 82 to supply the same with fuel.

One of the features of the invention lies in the presence of fuel injection ports 90 passing through the annular wall 80. By virtue of these ports 90, part of the fuel travelling in the second annular space 82 is deflected to be directly integrated in the first space 72, to undergo a first atomisation phase by the air flow 77 therein. The other part of the fuel travels in turn normally as a film up to the downstream end of the annular wall 80. Alternatively, the injection ports 90 could be arranged further upstream in order to introduce fuel as soon as possible in the first space 72. By way of indicating example, these ports 90 could be provided at the outlet of the vanes 76, alternately disposed with the same along the circumferential direction.

Figure 6:
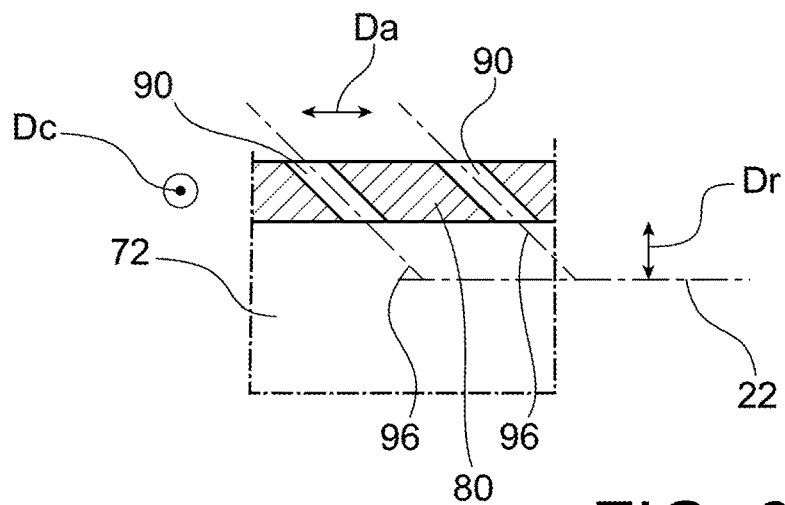
FIG. 6 is an enlarged cross-section view of a part of the injection system shown in the preceding figures, showing the annular wall of the injection system equipped with fuel injection ports.
Figure 7:
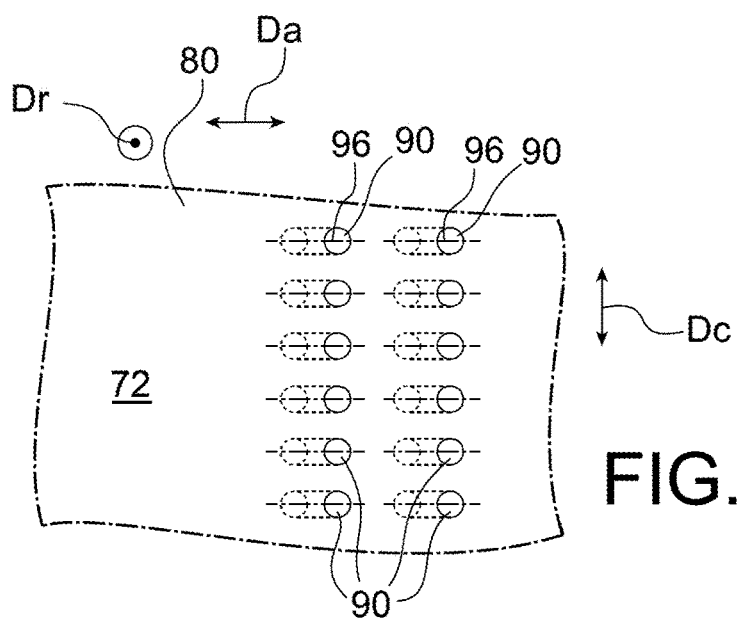
FIG. 7 represents a part of the annular wall, when viewed from inside the same and developed in a plane parallel to the central axis of the injection system.

In reference more particularly to FIGS. 6 and 7, the injection ports 90 are arranged in circumferential rows centred on the axis 22, these rows being for example two or more in number. In this regard, it is noted that conventionally, the axial Da and circumferential Dc directions are orthogonal to a radial direction Dr of the injection system 18. The rows of ports 90 are either axially aligned along the direction Da as visible in FIGS. 6 and 7, or arranged staggeredly by having a circumferential offset of half a pitch.

By way of indicating example, the axial pitch along the direction Da between two rows of directly consecutive ports is between 1 and 2.5 mm, and the circumferential pitch Pc between two directly consecutive ports 90 of a same row, is between 2 and 5 mm. Further, the diameter of each port 90 can be between 0.2 and 0.6 mm, and preferably be in the order of 0.4 mm.

In the embodiment of FIGS. 6 and 7, the outlet axes 96 of the injection ports 90 are included in axial planes of the system 30, that is dummy planes (not represented) integrating the central axis 22. In other words, these axes have no circumferential components along the direction Dc, such that an only axial injection is achieved. However, in their respective axial planes, the axes 96 each have a tilt along the radial direction Dr, such that the fuel can be ejected downstream inside the first space 72.

Figure 8:
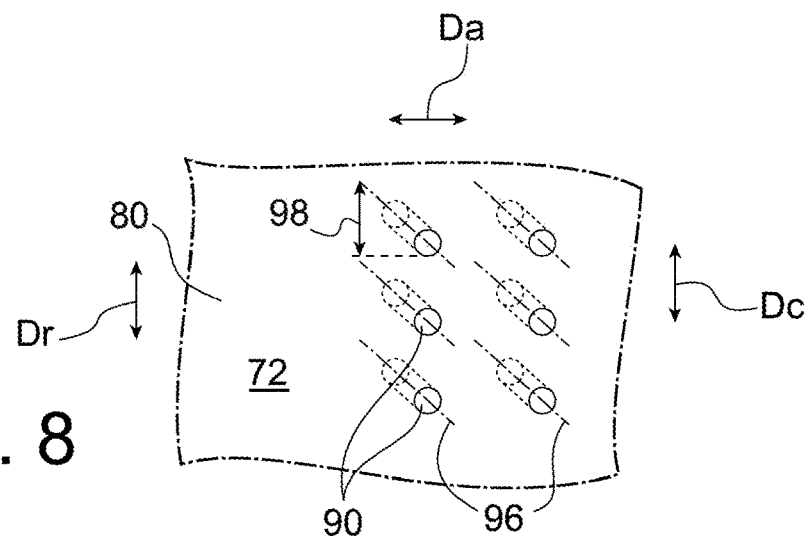
FIG. 8 is a view similar to that of FIG. 7, with the fuel injection ports being in a different configuration.

Alternatively, as shown in FIG. 8, the outlet axes 96 can have a non-zero circumferential component 98 in order to generate a spinning of the fuel about the axis 22 in the first space 72. In this regard, it is noted that the spinning direction of the fuel in the first space 72 can be identical or reverse to that of the air flow 77, even if a reverse direction is favoured in order to promote fuel atomisation and increase shearing of the fuel layer.

Figure 3:
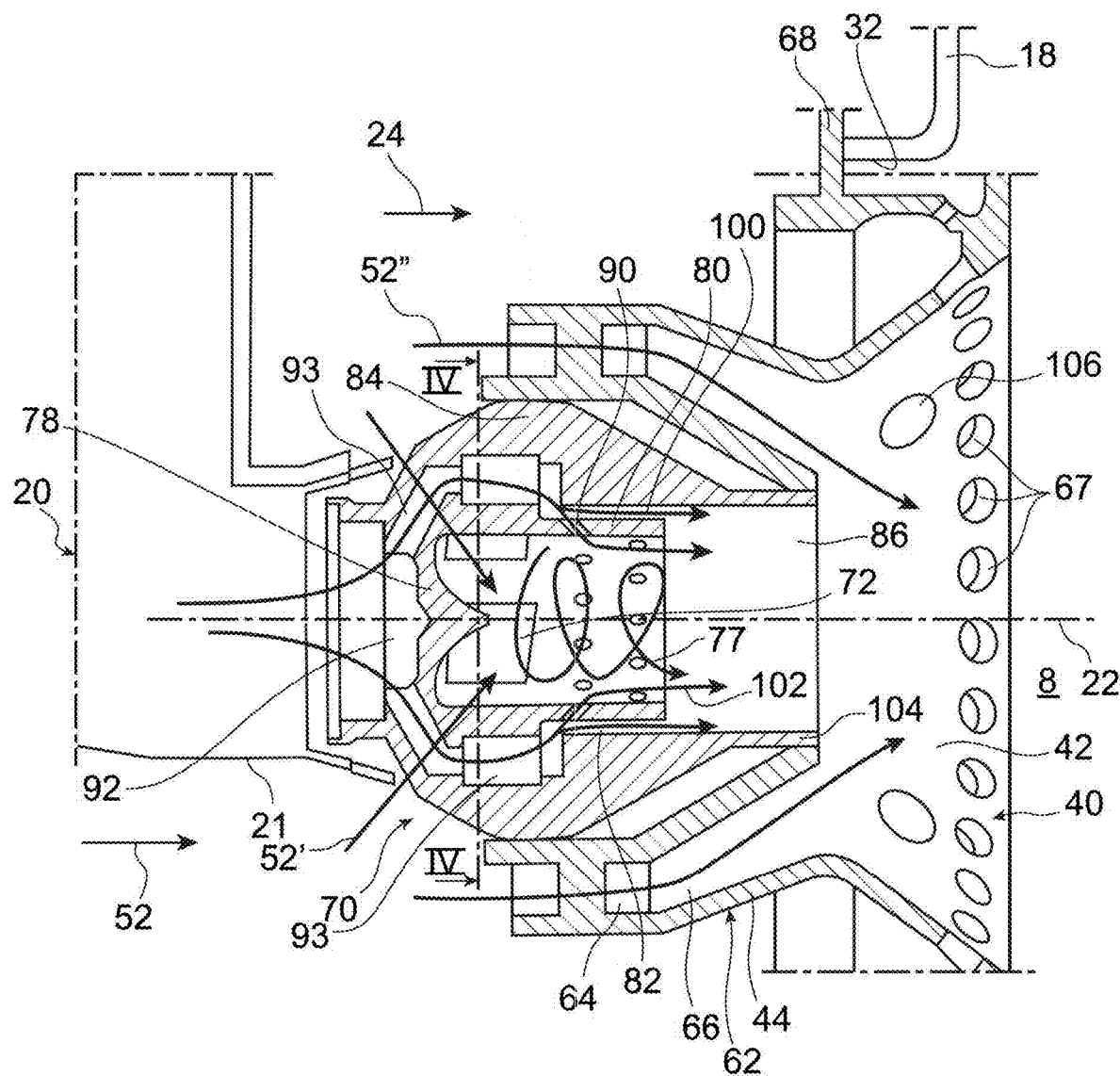
FIG. 3 is a detailed longitudinal cross-section view of one of the injection systems equipping the combustion chamber shown in the preceding figure.
Figure 4:
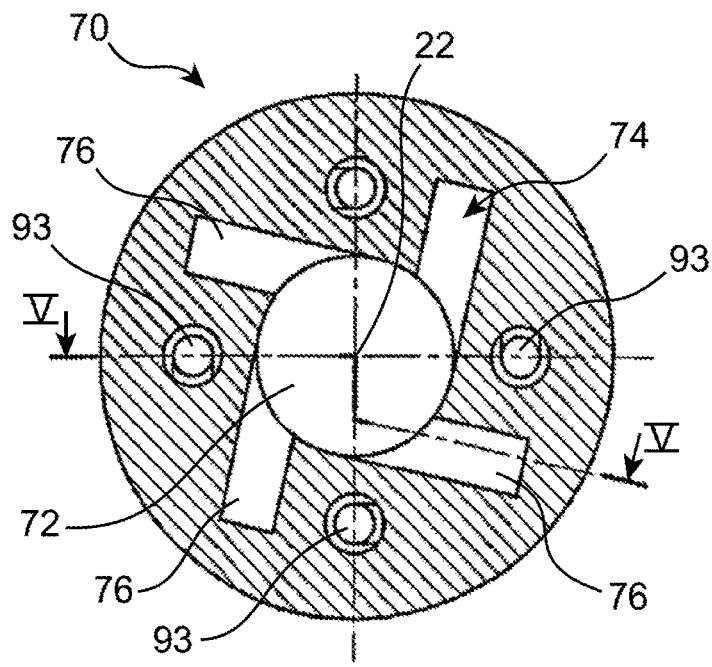
FIG. 4 is a cross-section view taken along line IV-IV of FIG. 3.
Figure 5:
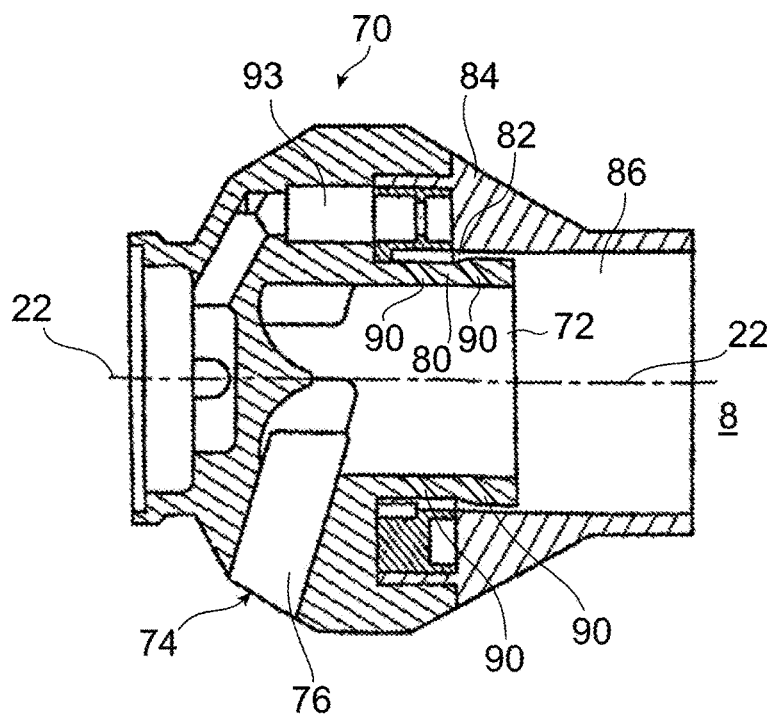
FIG. 5 is a cross-section view taken along line V-V of FIG. 4.

Back to FIG. 3, it is noted that the injector 20 cooperates with the injection system 30 such that the fuel follows the distributor 92 and then the ducts 93, to be then as a film 100 travelling downstream in the second space 82, with a tangential component.

Simultaneously, a fuel flow rate 102 is taken from the second space 82 by the injection ports 90, to penetrate the first space 72 within which the air 77 and fuel 102 flows mix with each other in view of a first fuel atomisation phase. This fuel flow rate is preferentially introduced in the space 82 with a tangential component before being mixed with the air flow 77.

The film 100 and the taken fuel flow rate 102 then join in the third space 86, within which they are first contained by the external surface 104 of the external element 84. By leaving the hollow body 70 of the injection system, the film 100 and the taken flow rate 102 are then atomised by the air flow 52" from the swirler 64, also generating a swirling flow opening into the divergent part of the aerodynamic bowl 40. This continuation of the process of atomising the fuel 100, 102 enables the flame 106, located inside the chamber, to be supplied.

By way of indicating purposes, it is noted that the design chosen thereby implements a circulation of a fuel film 100 through the internal swirler 74 of the injection system, as is known in prior art. This fuel film injection design differs from the so-called "aeromechanical" injection, in which fuel is injected via a port to form a conical spray.

Of course, various modifications can be provided by those skilled in the art to the invention just described, only by way of non-limiting examples.

What is claimed is:

1. An aerodynamic injection system (30) for a combustion chamber (8) of an aircraft turbomachine, the system (30) comprising:
    a hollow central body (70) including:
        an annular wall (80),
        an external element (84) located radially outward of the annular wall (80),
        a first space (72) for air circulation, the first space (72) located radially inward of the annular wall (80),
        a second space (82) located radially between the annular wall (80) and the external element (84),
        a first air introduction swirler (74) enabling air located outside the hollow central body (70) to penetrate inside the first space (72),
        a fuel circuit (92, 93, 82) arranged at least partly about the first space (72), the fuel circuit (92, 93, 82) comprising the second space (82) for circulating a fuel film and fuel supply means (92, 93) communicating with said second space (82), the second space (82) being annular, and
        fuel injection ports (90) communicating the fuel circuit (92, 93, 82) with said first space (72), wherein the fuel injection ports (90) open into the first space (72) downstream from the first air introduction swirler (74); and
    an external body (62) including a second air introduction swirler (64) that opens into an annular channel (66) externally delimited by an aerodynamic bowl (40), the aerodynamic bowl (40) having a downstream flared end (42),
    wherein the second air introduction swirler (64) is an axial swirler arranged at an upstream end of the external body (62),
    wherein the first and second spaces (72, 82) of the hollow central body (70) open into a third space (86) for an air-fuel mixture, the third space (86) being arranged downstream of the second space (82) in order to inject the fuel film into the third space (86),
    wherein the third space (86) extends to a downstream end of the hollow central body (70) and then is flared to extend up to the downstream flared end (42) of the aerodynamic bowl (40), and
    wherein the fuel injection ports (90) are configured such that a portion of fuel in the second space (82) is diverted from the second space (82) through the fuel injection ports (90) into the first space (72), while another portion of the fuel travels through the second space (82) and is discharged from a downstream end of the second space (82) into the third space (86).

2. The aerodynamic injection system according to claim 1, wherein the fuel injection ports (90) pass through said annular wall (80).

3. The aerodynamic injection system according to claim 1, wherein the fuel injection ports (90) are distributed in circumferential rows about a central axis (22) of the aerodynamic injection system, said rows being axially aligned or staggeredly arranged.

4. The aerodynamic injection system according to claim 1, wherein the fuel injection ports (90) each have an outlet axis (90) included in an axial plane of the injection system.

5. The aerodynamic injection system according to claim 1, wherein the fuel injection ports (90) each have an outlet axis (96) having a non-zero circumferential component (98), so as to generate a spinning of a fuel flow rate penetrating said first space (72).

6. The aerodynamic injection system according to claim 1, wherein an outlet axis (96) of each of the fuel injection ports (90) is tilted so as to inject fuel downstream inside said first space (72).

7. The aerodynamic injection system according to claim 1, wherein the first air introduction swirler (74) includes vanes (76).

8. The aerodynamic injection system according to claim 7, wherein said fuel supply means (92, 93) comprise a plurality of ducts (93).

9. The aerodynamic injection system according to claim 8, wherein the plurality of ducts (93) are arranged alternately with said vanes (76) of the first air introduction swirler (74), along a circumferential direction (Dc).

10. The aerodynamic injection system according to claim 7, wherein the vanes (76) are tilted so as to generate a spinning of an air flow penetrating said first space (72).

11. An aircraft turbomachine (1) comprising the aerodynamic injection system (30) according to claim 1.

12. The aerodynamic injection system according to claim 1, wherein the first air introduction swirler (74) opens into a first portion of the first space (72), and the fuel injection ports (90) open into a second portion of the first space (72) that is downstream from the first portion.

13. The aerodynamic injection system according to claim 1, wherein the aerodynamic bowl (40) is flared in a downstream direction such that the aerodynamic bowl (40) progressively expands radially in the downstream direction to the downstream flared end (42).

* * * * *